UNITED STATES PATENT OFFICE.

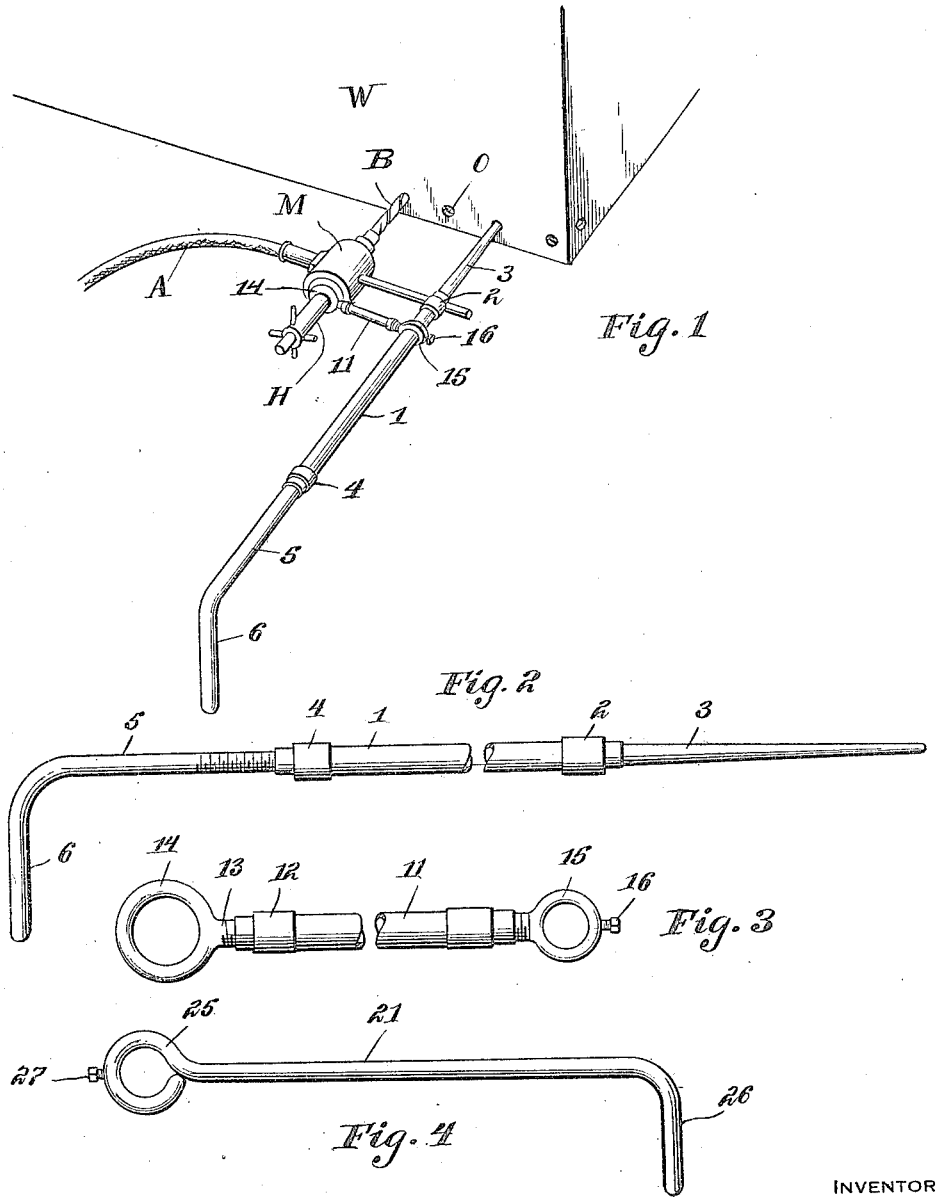

GILBERT B. SERPAS, OF VIOLET, LOUISIANA.

ATTACHMENT FOR DRILLS.

1,231,438.  Specification of Letters Patent.  Patented June 26, 1917.

Application filed February 27, 1917. Serial No. 151,307.

*To all whom it may concern:*

Be it known that I, GILBERT B. SERPAS, a citizen of the United States, residing at Violet, in the county of St. Bernard and State of Louisiana, have invented new and useful Improvements in Attachments for Drills, of which the following is a specification.

This invention relates to boring and drilling, and more especially to appliances such as braces or jigs for holding the drill or its motor and guiding the same properly to its work; and the object of the same is to produce an attachment of this kind which will protect the workman from injury in case the motor should slip out of his hand, and by means of which also a series of holes may be bored at properly spaced intervals.

The invention consists in a bar or staff having a point for insertion in one of the holes already bored and a handle provided with a hook passing over the operator's shoulder, and an adjustable guide slidably mounted at one end on said bar or staff and its other end supporting the drill or the motor thereof. Details will be found in the following specification, reference being had to the drawings wherein:—

Figure 1 is a perspective view showing this attachment applied to the air motor of a rotary drill and at work.

Figs. 2 and 3 are side elevations of the guide and the staff in detail on an enlarged scale.

Fig. 4 is a similar side elevation of an additional member which may sometimes be employed as explained below.

The work W may be any object (usually sheet metal) in which is to be bored a series of holes or openings O, as along the edge of a metal plate which is to go on a ship's side. In Fig. 1 is shown a rotary motor M driven by compressed air supplied through the tube A and having a handle or head H as usual, and the drill B of this motor is of such size and shape that it will bore the holes O or will ream out or reshape other smaller holes already formed along the work W. My invention is an attachment which is shown applied and at work in Fig. 1, and in detail in the other views.

The staff best seen in Fig. 3 has a central portion or shank 1 which may well be of tubing, and on one end of the same is screwed a coupling 2, and into the latter is screwed a pointed element 3. On the other end of the shank is another coupling or reducer 4, and into the latter is screwed a handle 5 which is preferably hooked as shown at 6. When at work, all threads are set up tight so that this staff has its various parts rigidly connected. The guide shown in Fig. 2 also has a shank 11 to one end of which is screwed a coupling or reducer 12, and into the same is screwed the threaded stem 13 of an eye 14. A similar coupling or reducer at the other end of the shank carries another eye numbered 15, and in the outside of this eye is a set screw 16. The eyes are not intended to be set up tight in the reducers.

In the use of this attachment, the head H is withdrawn from the motor A and passed through the larger eye 14, and then replaced in the motor, the stems of the two eyes are adjusted within the couplings 12 to the proper distance, and the eye 15 (which was already mounted on the shank 1 of the staff) is adjusted along the same and secured at a proper point thereon by setting up the set screw 16. When now the point 3 is inserted in one of the holes or openings O in the work W, it will be obvious that the axial line of the motor and drill will bring the tip of the latter at a proper point to bore another hole. The operator places the handle 5 over his shoulder with the hook 6 down his back, and, grasping the motor in his hands, he bears the same to its work, the shank of the head sliding through the eye 14 as he feeds the drill into the hole being bored. It will be clear that he may feed the motor and drill forward, or retract it, and stop and start the motor as the case demands, without the least fear that it will get out of his hands to the injury of himself or his attendant; and in fact, even if he should withdraw the drill entirely from the hole being formed, the guide of Fig. 2 will support the weight of the motor from the staff, the pointed end of the latter being inserted in one of the holes and the handle end resting on the operator's shoulder. If the work has been started at the right side of Fig. 1, with the holes say, an inch apart, each time the point 3 is advanced one hole the center of the drill will be advanced one inch and therefore future holes along the line can be bored exactly at the same distance apart without the necessity of taking accurate measurements.

The additional member shown in Fig. 4 has a shank 21 with a hook 26 at one end and an eye 25 at its other end, preferably provided with a set screw 27; and this member is for use when the attachment is employed at the corner of a piece of work or in other places where it is not convenient to pass the main handle over the operator's shoulder. The eye 25 is caused to surround the shank 1 of the staff, and is held in adjusted position thereon by setting up the set screw 27. If the metal of the work being bored is very hard, or the hole therein large, or for any reason great strength is required, it is quite possible to apply this additional member to the main staff and pass its outer end over the shoulder of the attendant, while the handle 5 of the staff passes over the shoulder of the workman so that both men (if there be two) support and steady the drill and its motor, and guide it properly to its work. I do not wish to be limited to the materials or exact details of construction, nor to the proportion of parts.

While I have shown this attachment as applied to rotary drills, it will be clear that it could be applied to a reciprocating drill, whether driven by air, steam, or electricity. In fact, it is not necessary that the machine be a drill at all, because it is quite conceivable that if it were, for instance, a pneumatic hammer or riveting machine as employed for upsetting the ends of rivets in attaching boiler plates, the attachment could still be used by inserting the point 3 in a hole forward of that one in which the rivet was being upset, and moving it along from time to time as the work progresses. In any case the adjustment of the stems of the eyes 14 and 15 in the ends of the shank 11 of the guide, permits the setting of the axial line of the machine at an appropriate distance from the axial line of the attachment, according to the necessities of the case.

I have described this invention as applied to drills, and its operation in connection with the work of drilling holes, but it will be clear that it could be used with equal advantage in reaming or enlarging holes already made. In fact, I lay no claim to the drill or the motor, my invention consisting more particularly in the mechanism for supporting these devices, no matter for what purpose they are used.

What is claimed as new is:—

1. An attachment for drilling machines and the like, the same comprising a straight staff having a point at one end and a handle at the other, and a guide made up of a shank, eyes having stems adjustably mounted in the extremities of said shank, and a set screw in one eye, this eye adapted to be adjustably mounted on the shank of the staff and the other eye adapted for the reception of the head of said machine.

2. The herein described tool guide comprising a staff having one end pointed for insertion in a hole already formed and the other end provided with a handle and a hook; and a guide made up of a shank, threaded couplings at its extremities, and eyes having stems adjustably mounted in said couplings, one of the eyes adapted to be adjustably mounted on the staff and the other eye to slidably receive said tool.

3. The combination with a drill, and an air motor therefor having a head; of a drill brace comprising a straight staff having a point at one end for insertion in a hole already formed, a smooth shank at its mid-length, and a handle at its other end, and a guide disposed transversely to the length of said staff and the axis of said motor and made up of a shank and eyes adjustably mounted in its extremities for respectively engaging the shank of the staff on the head of the drill, for the purpose set forth.

In testimony whereof I affix my signature.

GILBERT B. SERPAS.